June 30, 1964    W. I. EVANS    3,139,005
VELOCITY ERROR COMPENSATING DEVICE
Filed March 2, 1961    2 Sheets-Sheet 1
*Fig.1*
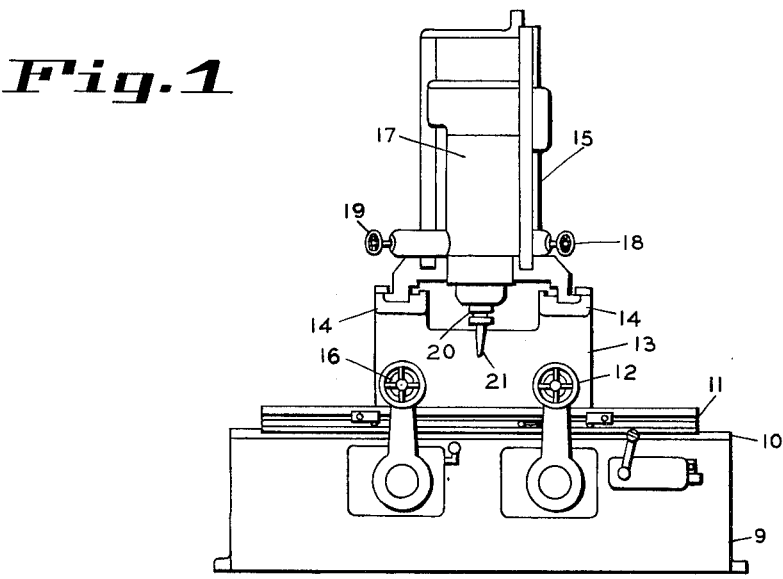
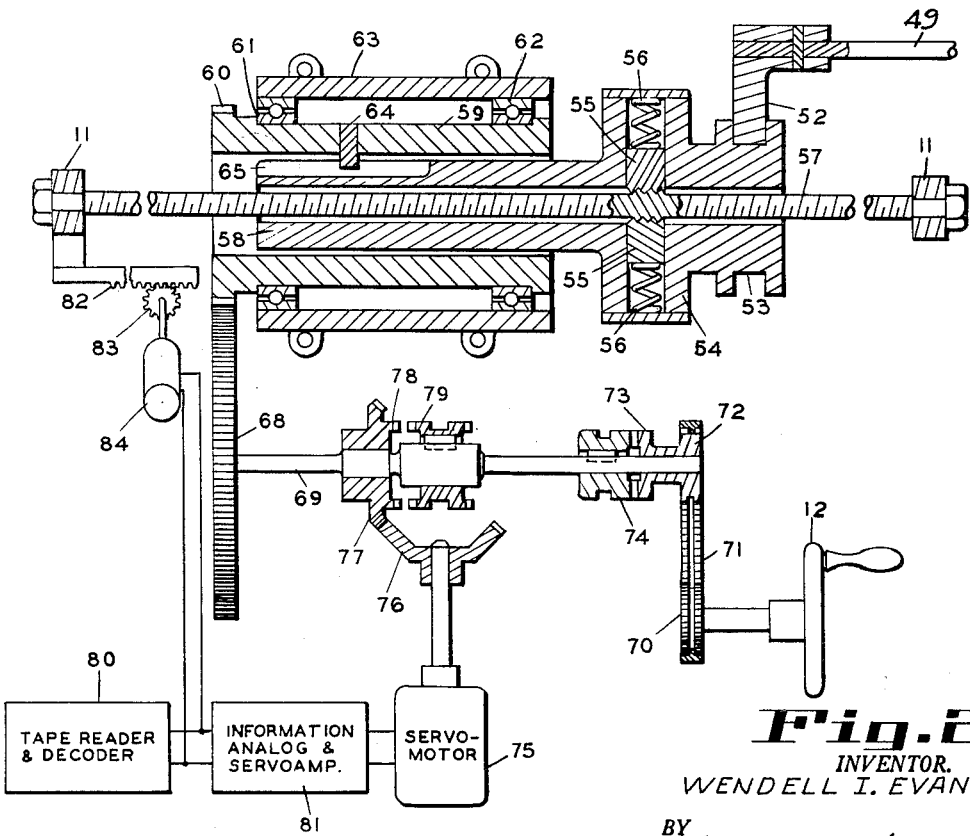
*Fig.2*
INVENTOR.
WENDELL I. EVANS
BY
*Howard O. Kiser*
*John F. Verhoeven*
ATTORNEYS June 30, 1964   W. I. EVANS   3,139,005
VELOCITY ERROR COMPENSATING DEVICE
Filed March 2, 1961   2 Sheets-Sheet 2
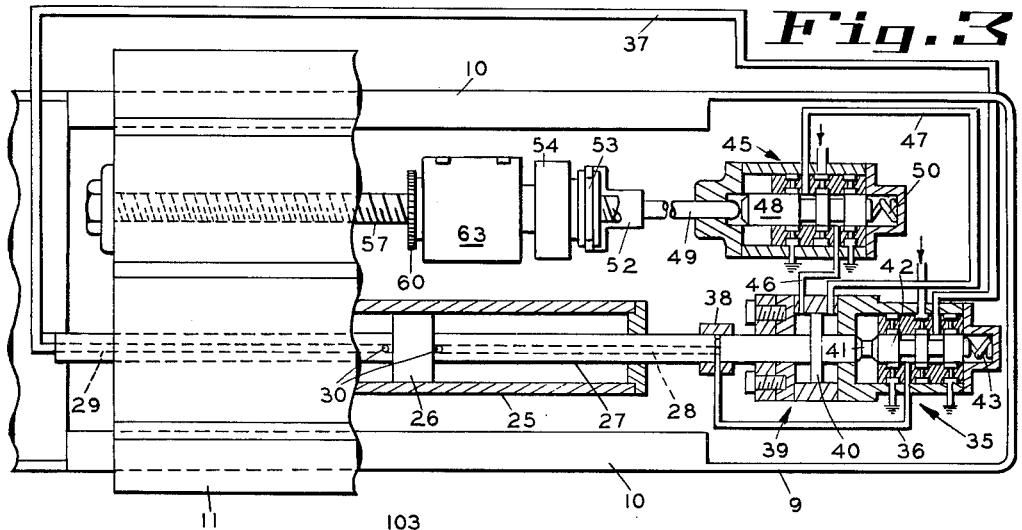
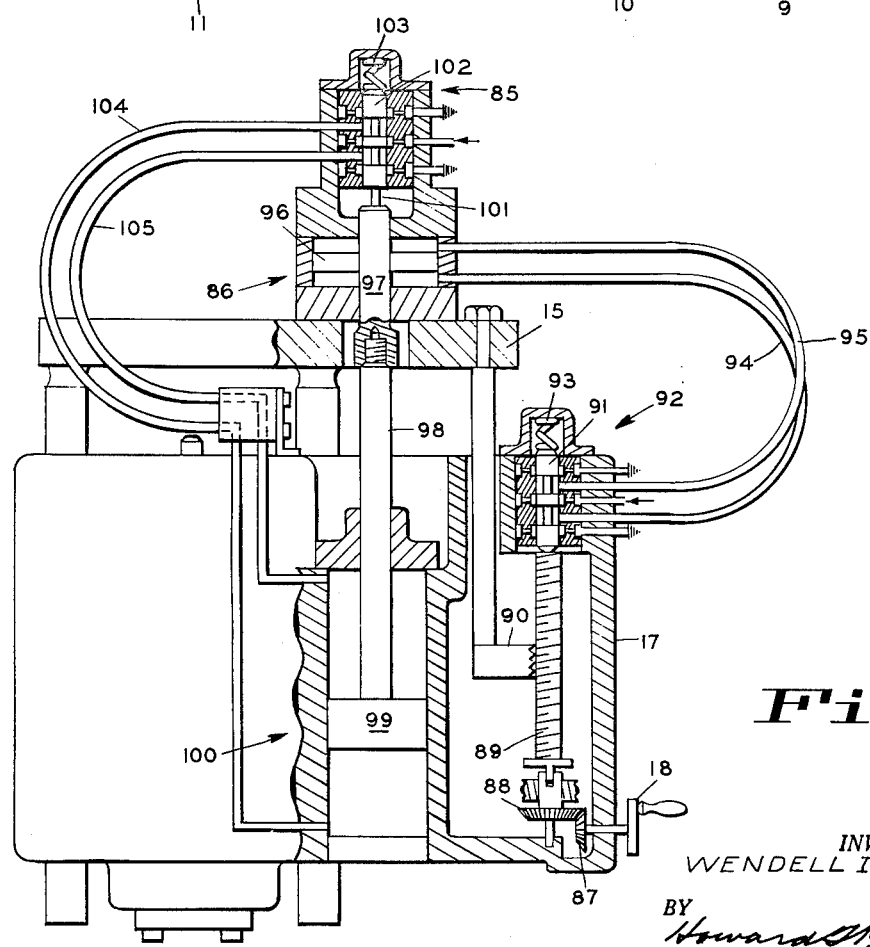
INVENTOR.
WENDELL I. EVANS
BY
ATTORNEYS

United States Patent Office 3,139,005
Patented June 30, 1964

3,139,005
VELOCITY ERROR COMPENSATING DEVICE
Wendell I. Evans, Cincinnati, Ohio, assignor to The Cincinnati Milling Machine Co., Cincinnati, Ohio, a corporation of Ohio
Filed Mar. 2, 1961, Ser. No. 92,833
9 Claims. (Cl. 91—168)

This invention relates to a velocity error compensating device for servomechanisms and, more particularly, to a means for eliminating the velocity error from hydraulically operated servomechanisms in a new and simplified manner.

It is a well known characteristic of servomechanisms that the controlled quality tends to lag the desired value when the apparatus is in motion. This discrepency, called the velocity error, is sometimes defined as the instantaneous difference in position between the input and output elements of the servomechanism when the system is in motion. This aberration results from the fact that a servomechanism is fundamentally an error actuated system and cannot operate without the presence of an error signal. It is possible, however, when the system is operating at a constant velocity, to compensate for this positional lag and bring the input and output elements into correspondence. One means for doing this is disclosed by U.S. Patent No. 2,727,419 granted December 20, 1955, on an application filed on March 23, 1951. However, the device described in the patent necessarily includes a supplemental slide, sometimes referred to as a "topping" slide, and an adjustable valve bushing for receiving the feedback signal from the slide. In U.S. Patent No. 2,716,925, granted September 6, 1955, on an application filed by E. G. Roehm, there is shown a velocity error compensation mechanism involving a pair of topping slides which are operated under the control of servovalves. These valves are actuated by a compensator adjusting cam which is positioned in accordance with the deflection of a tracing finger. The Roehm structure is effective to maintain a constant relation between the effective contact surface of the tracer and the cutting surface of the tool.

One of the objects of the present invention is to provide a velocity error compensating device which eliminates the need for a topping slide.

Another object of the invention is to provide a velocity error compensating device which has the form of a self-contained, compact unit which can be applied directly to an existing machine tool structure with only minor alterations.

Another object of the invention is to provide a package type of the velocity error compensating device which consists simply of a hydraulic actuator and a servovalve operated thereby.

With these and other objects in view which will become apparent from the following description, the invention includes certain novel features of construction and combinations of parts, the essential elements of which are set forth in the appended claims, and a preferred form or embodiment of which will hereinafter be described with reference to the drawings which accompany and form a part of this specification.

In the drawings:

FIG. 1 is a front elevation of a hydraulically operated milling machine to which the invention shown in the succeeding figures may be applied.

FIG. 2 is a detailed view of the signal input element for the servomechanism shown in FIG. 3.

FIG. 3 is a diagrammatic view of the hydraulic servomechanism for the milling machine table with the velocity error compensating unit shown applied thereto.

FIG. 4 is a diagrammatic view of the velocity error compensated servomechanism for the spindle carrier slide of the machine tool.

In FIG. 1 is shown a three-axis hydraulically actuated milling machine of a type suitable for use with the present invention. This machine may be of the same general type as that shown in Patent No. 2,068,889 to which reference may be had for further details regarding its construction. The machine has a bed 9 provided with a pair of parallel ways 10 on which a table 11 is mounted for longitudinal sliding movement under the control of either a handwheel 12 or a servomotor as will hereinafter be described. At the rear of the machine, the bed 9 is provided with an upstanding pedestal 13 on which are horizontal guideways 14 disposed at right angles to the table ways 10. A cross slide 15 is supported on the guideways 14 for horizontal sliding movement at right angles to the movement of the table 11. Forward and backward movement of the cross slide may be effected as desired by manipulation of a handwheel 16 mounted on the front apron alongside the handwheel 12. Supported on the forward portion of the cross slide for vertical sliding movement is a spindle carrier 17 which may be adjusted up or down on the cross slide by manipulation of the intergeared handwheels 18 and 19. The spindle carrier is provided with a motor driven spindle 20 which is adapted to receive a milling cutter 21 of a type suitable for the job at hand.

Movements of the table 11 are effected by a hydraulic actuator which, as shown in FIG. 3, may comprise a cylinder 25 secured to the table 11 and a piston 26 fitted within the cylinder and connected to a piston rod 27. The piston rod extends through both ends of the cylinder and hydraulic fluid is delivered to the expansible chambers on either side of the piston 26 by longitudinally extending bores 28 and 29 in the piston rod 27. These bores communicate with the cylinder chambers through radial holes 30 in the piston rod on each side of the piston. Control of the flow of fluid to and from the cylinder chambers is effected by a secondary servovalve 35 provided with motor ports to which conduits 36 and 37 are connected. As shown, the conduit 36 is connected by a fitting 38 with the bore 28 while the conduit 37 is connected with the bore 29 by a fitting on the free end of the piston rod 27.

At its right-hand end, the piston rod enters a compensating cylinder 39 which is fixed to the bed 9 where it is secured to a piston 40 working within the cylinder. Beyond the piston 40 the piston rod extends through the right hand side of the cylinder 39 where it abuts against a tenon 41 on spool 42 of valve 35.

Control of the flow of hydraulic fluid to and from the compensating cylinder is controlled by a primary servovalve 45 which is provided with motor ports connected by conduits 46 and 47 to opposite ends of the cylinder 39. The servovalve 45 is fitted with a spool 48 which, at its left-hand end, is engaged by a plunger 49. This plunger forms a part of the signal input means for the servomechanism and is shown in greater detail in FIG. 2 of the drawings. As shown in this figure, the plunger 49 is connected to a fork 52 which is accommodated within an annular groove 53 provided in a nut housing 54. This housing is provided with a pair of radial bores within which are slidably received a pair of half-nuts 55 which are urged by compression springs 56 into meshing engagement with a feed screw 57 which is secured at its opposite ends to the table 11.

The housing 54 is provided with a cylindrical extension 58 which is journaled in a sleeve 59 which is provided at one end with gear teeth 60. The sleeve is supported for rotation in bearings 61 and 62 supported in a bearing block 63 which is secured to the frame of the machine. The nut housing 54 is drivingly connected with the sleeve 59 by means of a key 64 engaging in a keyway 65 provided in the extension 58.

Meshing with the gear 60 is a spur gear 68 secured to a shaft 69 suitably journaled in the frame of the machine tool. A driving connection is provided from the handwheel 12 to the shaft 69 by means of a sprocket 70 secured to the handwheel and meshing with a drive chain 71 passing over a second sprocket 72 rotatably journaled on the shaft 69. The sprocket 72 is provided with clutch teeth 73 which are adapted to cooperate with a clutch element 74 slidable on the shaft 69. The element 74 is keyed to the shaft, and suitable shifter means is provided for shifting the element 74 along the shaft into and out of engagement with the clutch teeth 73.

Alternatively, the gear 68 and shaft 69 may be driven by a servomotor 75 which drives a bevel gear 76 meshing with a cooperating bevel gear 77 rotatably journaled on the shaft 69. The gear 77 is provided with clutch teeth 78 adapted to cooperate with a clutch element 79 slidably mounted on the shaft 69 and keyed thereto. Hence, a driving connection may be provided between the servomotor and the shaft 69 by engagement of the clutch elements 78 and 79. Numerical input information may be provided to the servomotor by means of conventional numerical control equipment including a tape reader and decoder 80 and an information analog and servoamplifier unit 81. Likewise, in accordance with conventional servomechanism practice, analog feedback information is provided to the servoamplifier 81 from the machine tool table 11 through a rack 82 carried by the table and meshing with a pinion 83 driving a potentiometer 84 or other suitable analog feedback unit.

It will be evident from the foregoing that when a command (input) signal is applied to the primary servovalve 45 through the rotation of gear 60, nut 54 and plunger 45, the spool 48 of the servovalve will be moved from its central or null position and hydraulic pressure will thereby be applied on one side or the other of the piston 40 of the compensating cylinder 39.

Operation of the velocity error compensating device is as follows: Assuming that the gear 60 is rotated in such a direction as to cause the plunger 49 to move to the left, as viewed in FIG. 3, the spool 48 will likewise move to the left under the influence of a spring 50 and cause pressure to be applied to the left-hand end of cylinder 39. This will cause the piston rod 27 to move to the right thereby moving the cylinder 25, table 11 and screw 57 also to the right. The screw 57 will move the nut 54 and plunger 49 to the right so as to move the spool 48 of primary servovalve 45 back to its null position when the table has moved a distance to the right equal to the input signal to plunger 49. However, at the same time that piston 40 moves the piston rod 27 to the right, it also moves the spool 42 of the secondary servovalve 35 to the right against the influence of spring 43. Thereby, fluid under pressure will be supplied to the right-hand end of cylinder 25 through the conduit 36 and cause the table to start moving to the right. However, this motion of the table will act through the screw 57 and plunger 49 to shift the spool 48 off its null point toward the right. The primary servovalve will thereby cause fluid under pressure to flow through the conduit 47 into the righthand end of the cylinder 39. This will cause the piston 40 to move toward the left thereby also moving the table 11, screw 57, and plunger 49 to the left. This two-fold cancelling motion will continue until the cylinder 39 has moved the spool 42 of valve 35 back to its centered or null position. The servovalves will thereby again be centered, and the table will have been moved a distance to the right equal to the input signal to plunger 49.

It will be observed that when the input signal to the primary servovalve calls for movement of the table either right or left at a constant velocity, the compensating cylinder will effect the initial movement of the table thereby displacing the spool 42 of the secondary servovalve accordingly. The primary servovalve will thereby be returned to its null position while the "running" signal to the table will be supplied by the secondary servovalve which controls the flow of fluid to and from the main cylinder 25 through conduits 36 and 37. Since the primary servovalve is in its central or null position while the table moves with constant velocity, the velocity error will be eliminated.

It is to be noted in connection with the velocity error compensating apparatus just described, that the parts added to the machine servosystem for accomplishing this purpose consist of the compensating cylinder 39 and the secondary servovalve 35. These parts may, if desired, be packaged as a single unit and supplied and installed on a machine as a single self-contained package. Hence, with the type of compensating apparatus which has just been described, minor modifications only of the machine tool structure will be required in order to apply the device to an existing machine. The use of topping slides, feedback valve bushings, etc., are eliminated thereby minimizing the expense and complication of the equipment.

In FIG. 4 the velocity error compensating device has been shown applied to the spindle carrier 17 of the machine tool shown in FIG. 1. In this case the compensating device again comprises a secondary servovalve 85 and a compensating cylinder 86 packaged together as a single unit and mounted on the cross slide 15 on which the spindle carrier 17 is mounted for vertical sliding movement. In this case, an input signal supplied to the hand wheel 18 is applied through bevel gears 87 and 88 to a feed screw 89 which engages with a stationary nut 90 supported on the cross slide 15. Hence, rotation of the handwheel will cause axial displacement of the screw 89 thereby displacing a spool 91 of a primary servovalve 92 under the influence of a spring 93. As in the device previously described in conjunction with the machine tool table, deflection of the primary servovalve will cause fluid under pressure to be applied through conduits 94 and 95 to one side or the other of the piston 96 within the compensating cylinder 86. The piston 96 is fastened to a piston rod 97 which, in turn, is connected to a piston rod 98 carrying a piston 99 working within a main cylinder 100. The cylinder 100 is attached to the frame of the spindle carrier 17 so that movements of the compensating cylinder piston 96 also cause corresponding movement of the spindle carrier. Thus, a feedback connection is provided through the stationary nut 90 to the screw 89 which returns the spool 91 to its centered or null position. The piston rod 97 abuts against a tenon 101 provided on the end of a spool 102 provided in the secondary servovalve 85. The spool 102 is urged into contact with the piston rod 97 by a compression spring 103, as shown. Hence, movement of the piston 96 will effect a corresponding displacement of the spool 102 of the servovalve 85 thereby controlling the flow of fluid under pressure to opposite ends of the main cylinder 100 through conduits 104 and 105.

The operation of the servosystem shown in FIG. 4 is the same as the system shown in FIG. 3, that is, input signals supplied to the primary servovalve 92 will effect a corresponding displacement of the compensating cylinder piston 96. Movement of this piston effects corresponding movement of the spindle carrier 17 and returns the spool 91 of the primary servovalve to its null position. Movement of the piston rod 97 is communicated to the spool 102 of the secondary servovalve and controls the flow of fluid under pressure to the main cylinder 100. Hence, when a constant velocity input signal is applied to the primary servovalve 92, this valve will be returned to its null position while the spool 102 of the secondary servovalve will be displaced from its null position and provide a "running" signal to the main cylinder 100 for operating the spindle carrier at a constant velocity in either direction of movement.

In the foregoing description, the invention has been described in connection with one possible form or embodiment thereof, and certain specific terms and language have therefore been used for this purpose. It is to be understood, however, that the present disclosure is illustrative rather than restrictive and that changes and modifications may be resorted to without departing from the invention as defined by the claims which follow.

What is claimed is:

1. A velocity error compensating device for causing the load member driven by a hydraulic servomechanism to respond to a velocity input signal without positional error comprising a frame, means on said frame for supporting the load member for forward and reverse movement thereon, means connected between said frame and said member for moving the latter in a forward or reverse direction including a reversible main hydraulic actuator and a reversible compensating hydraulic actuator arranged in series between said frame and said member, signal input means, a primary servovalve communicatively connected with said compensating actuator and operable by said signal input means to causes displacement of said load member in accordance with the magnitude of the input signal, a secondary servovalve communicatively connected with said main actuator and operable by said compensating actuator for moving said load member in accordance with the movement of said compensating actuator, and a feedback connection between said load member and said signal input means for reducing the input signal to said primary servovalve as the load member responds thereto whereby, upon application of a constant velocity signal to said input means, said compensating actuator will be displaced in accordance with the magnitude of the input signal, said primary servovalve will be returned to a null position, and said secondary servovalve will cause said main actuator to move said load member at a velocity corresponding to the magnitude of the input signal.

2. The velocity error compensating device of claim 1 wherein said feedback connection includes a pair of co-operating elements one of which is supported on said frame and the other of which is carried by the load member.

3. The velocity error compensating device of claim 2 wherein said one element is supported for limited movement relative to said frame along the path of travel of said load member, and wherein said connection also includes means to transmit the movement of said one element to said primary servovalve.

4. The velocity error compensating device of claim 3 wherein said signal input means includes means to drive said one element in a direction and to an extent corresponding to the sign and amplitude of the input signal.

5. The velocity error compensating device of claim 1 wherein said feedback connection includes a lead screw carried by said load member and a nut supported on said frame for limited movement in the direction of travel of said load member, and said signal input means includes means to rotate said nut in a direction and to an extent corresponding the sign and amplitude of said input signal, and means to transmit the limited movement of said nut in the direction of travel of said load member to said primary servovalve.

6. A velocity error compensating device for use with a hydraulically operated servomechanism including a load member, a main hydraulic actuator for moving the load member, a primary servovalve, a signal input means for actuating said servovalve, and a feed back connection between the load member and the signal input means, said compensating device comprising a secondary servovalve communicatively connected with said main actuator, a compensating hydraulic actuator connected in series with said main actuator for moving said load member and for actuating said secondary servovalve, and means communicatively connecting said primary servovalve with said compensating actuator whereby operation of said primary servovalve by said signal input means will cause said compensating actuator and said load member to be displaced in accordance with the magnitude of the input signal, said primary servovalve to be returned to a null position through said feedback connection, and said secondary servovalve to control movement of said main actuator and load member at a velocity corresponding to the magnitude of the input signal.

7. The velocity error compensating device of claim 6 wherein said feedback connection includes a pair of co-operating elements one of which is carried by the load member and the other of which is supported for limited movement along the path of travel of said load member.

8. The velocity error compensating device of claim 7 wherein said signal input means includes means to drive one of said elements in a direction and to an extent corresponding to the sign and amplitude of the input signal, and means to transmit the limited movement of said other element to said primary servovalve.

9. A feedback control system having a velocity error compensating device for causing a load member operated by a main hydraulic actuator to respond to a velocity input signal without velocity error comprising a primary servovalve adapted to respond to the input signal, a compensating hydraulic actuator connected in series with said main hydraulic actuator and controlled by said primary servovalve for displacing said load member in accordance with the magnitude of the input signal, a secondary servovalve adapted to respond to movement of said compensating actuator for controlling the operation of said main hydraulic actuator, and a feedback connection from said main actuator to said primary servovalve for causing said primary servovalve to be returned to a neutral position while said secondary servovalve controls the movement of the load member by said main actuator at a velocity corresponding to the magnitude of the input signal.

References Cited in the file of this patent

UNITED STATES PATENTS

| | | |
|---|---|---|
| 2,670,144 | Johnson | Feb. 23, 1954 |
| 2,716,925 | Roehm | Sept. 6, 1955 |
| 2,791,885 | Sassen | May 14, 1957 |